United States Patent [19]
Lee

[11] Patent Number: 6,035,204
[45] Date of Patent: Mar. 7, 2000

[54] METHOD FOR RELEASING CALL IN CORDLESS TELEPHONE

[75] Inventor: Eui-Jae Lee, Gumi, Rep. of Korea

[73] Assignee: SamSung Electronics Co., Ltd., Suwon, Rep. of Korea

[21] Appl. No.: 08/959,070

[22] Filed: Oct. 28, 1997

[30] Foreign Application Priority Data

Oct. 28, 1996 [KR] Rep. of Korea ...... 96-49240

[51] Int. Cl.[7] ............... H04M 11/00
[52] U.S. Cl. ............. 455/462; 455/426; 455/528
[58] Field of Search ............... 455/517, 528, 455/507, 566, 462, 421, 426; 379/266

[56] References Cited

U.S. PATENT DOCUMENTS

| | | | |
|---|---|---|---|
| 4,974,251 | 11/1990 | Ohta et al. | 455/462 |
| 5,231,657 | 7/1993 | Umemoto et al. | |
| 5,260,993 | 11/1993 | Breeden et al. | 379/266 |
| 5,297,203 | 3/1994 | Rose et al. | 380/9 |
| 5,371,783 | 12/1994 | Rose et al. | 455/464 |
| 5,469,496 | 11/1995 | Emery et al. | 455/461 |
| 5,497,415 | 3/1996 | Kagi. | |
| 5,535,429 | 7/1996 | Bergenlid et al. | 455/507 |
| 5,802,476 | 9/1998 | Nakajima et al. | 455/462 |
| 5,805,982 | 9/1998 | Hulsebosh | 455/62 |
| 5,892,817 | 4/1999 | Will | 379/102.2 |

*Primary Examiner*—William G. Trost
*Assistant Examiner*—Sonny Trinh
*Attorney, Agent, or Firm*—Robert E. Bushnell, Esq.

[57] ABSTRACT

A cordless telephone releases a telephone call, in case that a handset unit is engaged in the telephone call over a predetermined time even though a telephone conversation has been completed. During the telephone conversation, a base unit periodically transmits busy state inquiry data to the handset unit, and checks whether response data thereto is received or not within a predetermined time. If the response data is not received within the predetermined time, the speech loop is automatically cut off. Therefore, in case that the handset unit misoperates due to the damage or the discharge of the battery, the base unit forcefully releases the call so that the user may make a telephone call with the base unit or another handset unit.

7 Claims, 4 Drawing Sheets

continued …

METHOD FOR RELEASING CALL IN CORDLESS TELEPHONE

CLAIM OF PRIORITY

This application makes reference to, incorporates the same herein, and claims all benefits accruing under 35 U.S.C. §119 from an application for METHOD FOR RELEASING CALL IN CORDLESS TELEPHONE earlier filed in the Korean Industrial Property Office on Oct. 28, 1996 and there duly assigned Ser. No. 49240/1996.

1. Field of the Invention

The present invention relates to a call release method in a cordless telephone, and more particularly to a method for releasing a call if a handset unit is continuously engaged in the call after completion of a telephone conversation.

2. Description of the Related Art

A cordless telephone includes a base unit connected to a telephone fine, and a handset unit with which a user can make a telephone call. The handset unit makes a radio communication with the base unit. Generally, the base unit continues to hold a speech loop between the handset unit and the telephone line, unless a call completion signal is received from the handset unit. Further, the base unit includes a carrier intensity sensing circuit for sensing an intensity of the carrier to release the call, in case that, for example, the handset unit runs out of the battery in the midst of the telephone call. For example, U.S. Pat. No. 5,535,429 for a Method of Disconnecting an Established Communication Connection in a Mobile Radio System to Bergenlid et al and U.S. Pat. No. 5,497,415 for an Automatic Release Device For Automatically Releasing the Hond-On Setting of an Outside Line Call, and Transfer Method for an Outside Line Call to Kagi discuss releasing a telephone line. However, if the carrier intensity sensing circuit misoperates for somewhat reasons, the base unit will misconceive that the handset unit is continuously in use. In that case, the base unit can not receive an incoming call, if any.

SUMMARY OF THE INVENTION

It is therefore an object of the present invention to provide a method for cutting off a speech loop, in case that a handset unit is continuously engaged in a call over a predetermined time even though a telephone conversation has been completed.

It is also an object of the present invention to provide a cordless telephone unit having a base unit and a handset, such that if call completion data is not received by the base unit within a first predetermined time, the base unit transmits to the handset a busy state inquiry signal.

It is yet another object of the present invention to disconnect the speech loop should the base unit fail to receive from the handset a response to its request for busy state inquiry.

According to an aspect of the present invention, a method for releasing a call in a cordless telephone including a base unit and a handset unit comprises the steps of checking whether the base unit has received call completion data from the handset unit; transmitting busy state inquiry data to the handset unit, if the call completion data is not received within a first predetermined time; and cutting off a speech loop, if response data which is responsive to the busy state inquiry data is not received from the handset unit within a second predetermined time.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
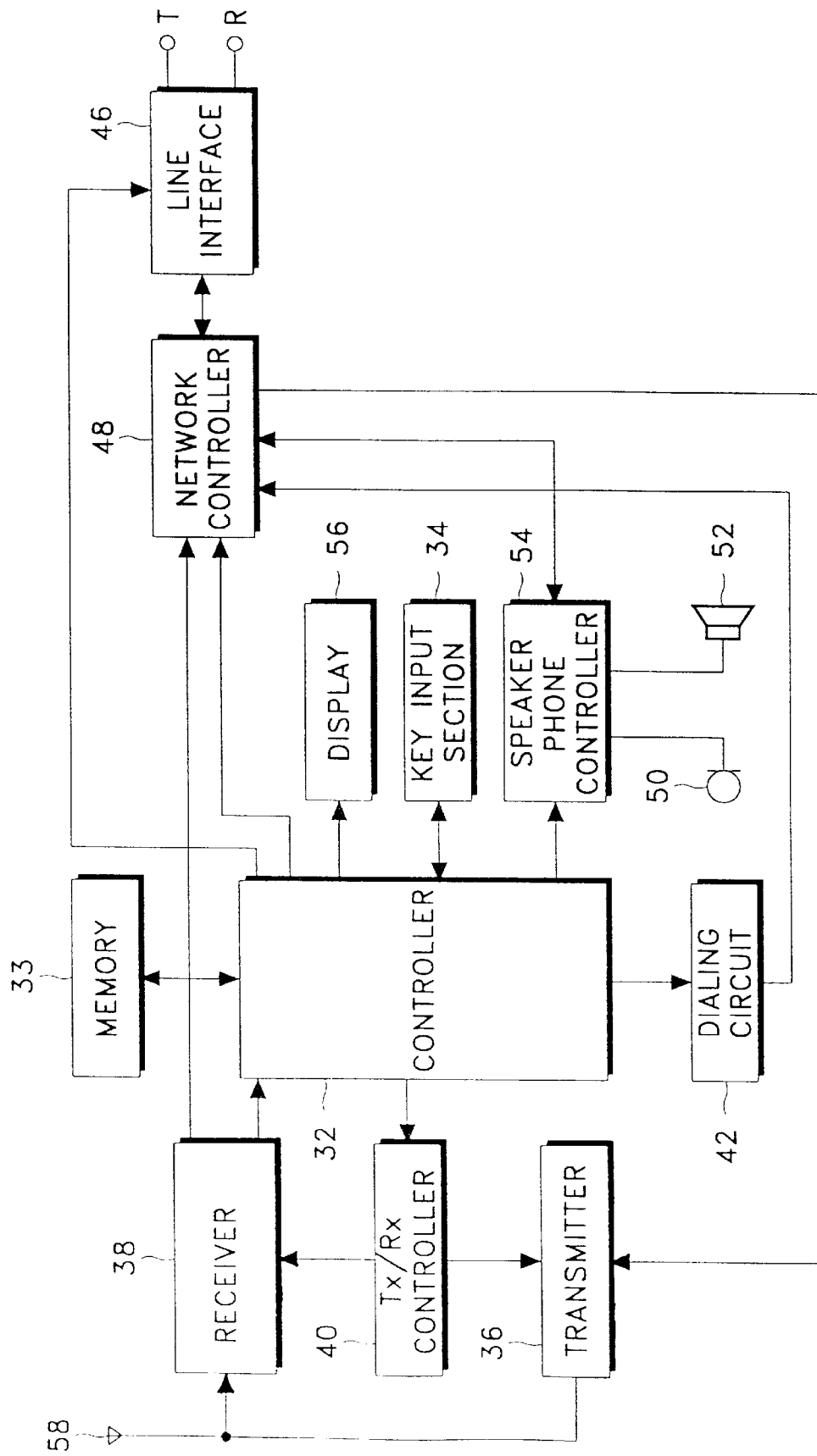
FIG. 1 is a block diagram of a base unit in a cordless telephone to which the present invention is applicable.

Referring to FIG. 1, a base unit of a cordless telephone includes a controller 32 for controlling an overall operation of the base unit. In accordance with the present invention, the controller 32 transmits busy state inquiry data when a handset unit engages a call over a predetermined time, and cuts off a speech loop upon receiving response data from the handset unit. A memory 33 is composed of a ROM (Read Only Memory) for storing a program, and a RAM (Random Access Memory) for temporarily storing data generated during executing the program. Further, the memory 33 stores a password for the handset unit and has a region for setting various functions. A key input section 34 includes a plurality of function keys for setting various functions and modes, and a plurality of numeric keys for performing a dialing function. The key input section 34 generates key data according to depression of the keys and provides the controller 32 with the key data. A transmitter 36 modulates an input signal and transmits the modulated signal via an antenna 58, under the control of the controller 32. A receiver 38 demodulates the signal received through the antenna 58 into a voice signal and provides the controller 32 with various control data. A transmission/reception controller 40 controls the transmitter 36 and the receiver 38 by using a transmitting/receiving frequency based on channel data generated from the controller 32. A dialing circuit 42 generates a DTMF (Dual Tone Multi-Frequency) or pulse dialing signal under the control of the controller 32. A line interface 46 interfaces between a telephone line (T, R) and the base unit, under control of the controller 32. A network controller 48 is connected to the transmitter 36, the receiver 38, the dialing circuit 42, and the line interface 46, so as to form a speech loop according to the control of the controller 32. A display 56 displays the key input status and an operational status of the base unit.

Figure 2:
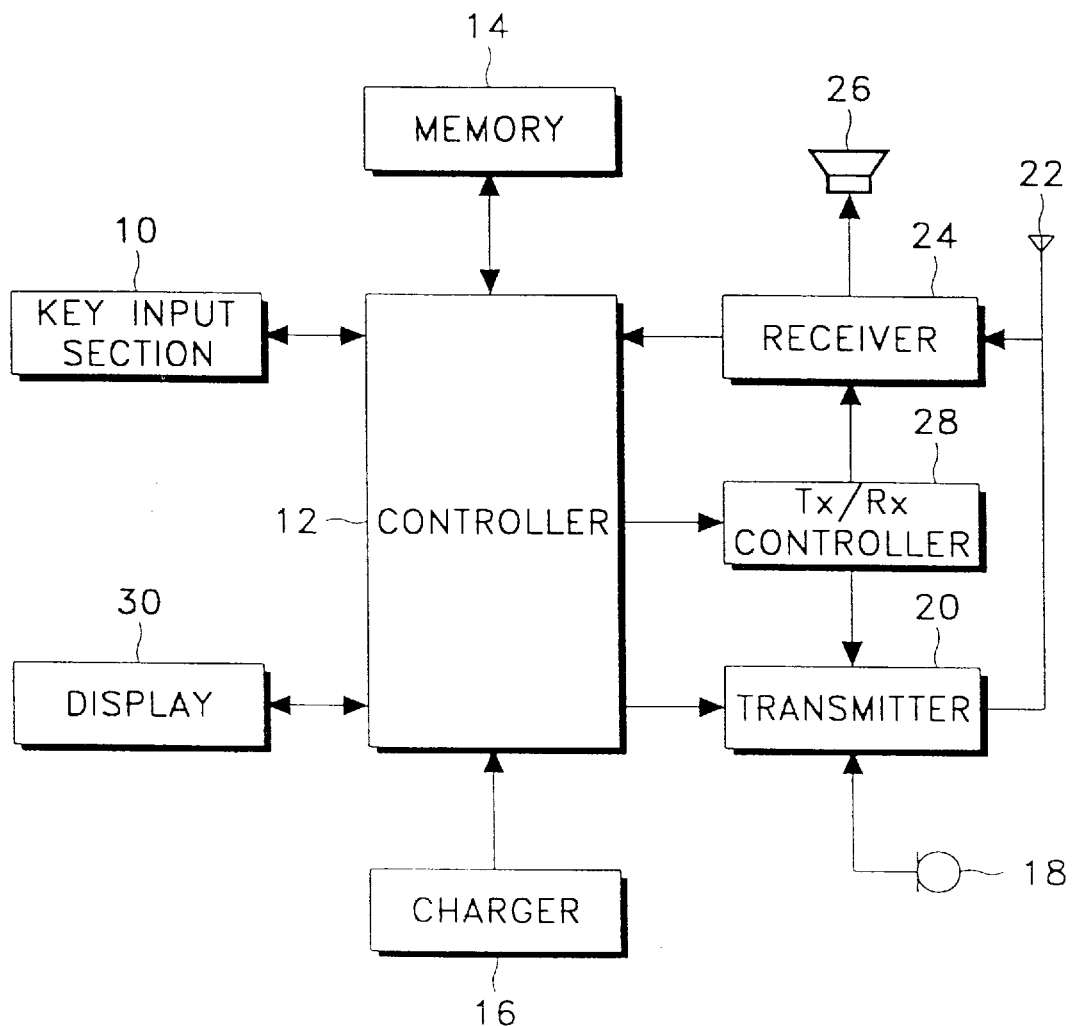
FIG. 2 is a block diagram of a handset unit in a cordless telephone to which the present invention is applicable.
Figure 3:
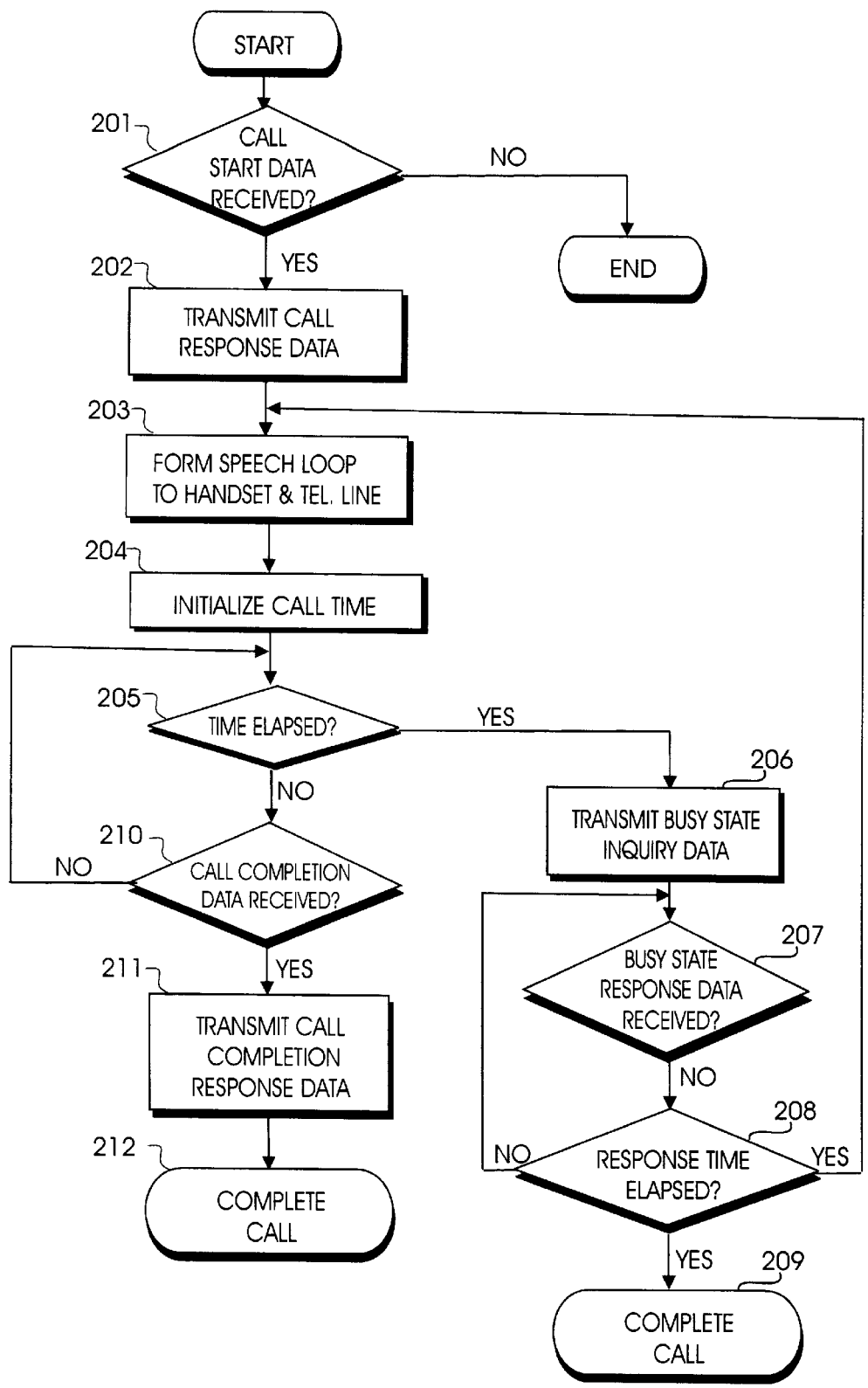
FIG. 3 is a flow chart for controlling the base unit of FIG. 1 according to an embodiment of the present invention.
Figure 4:
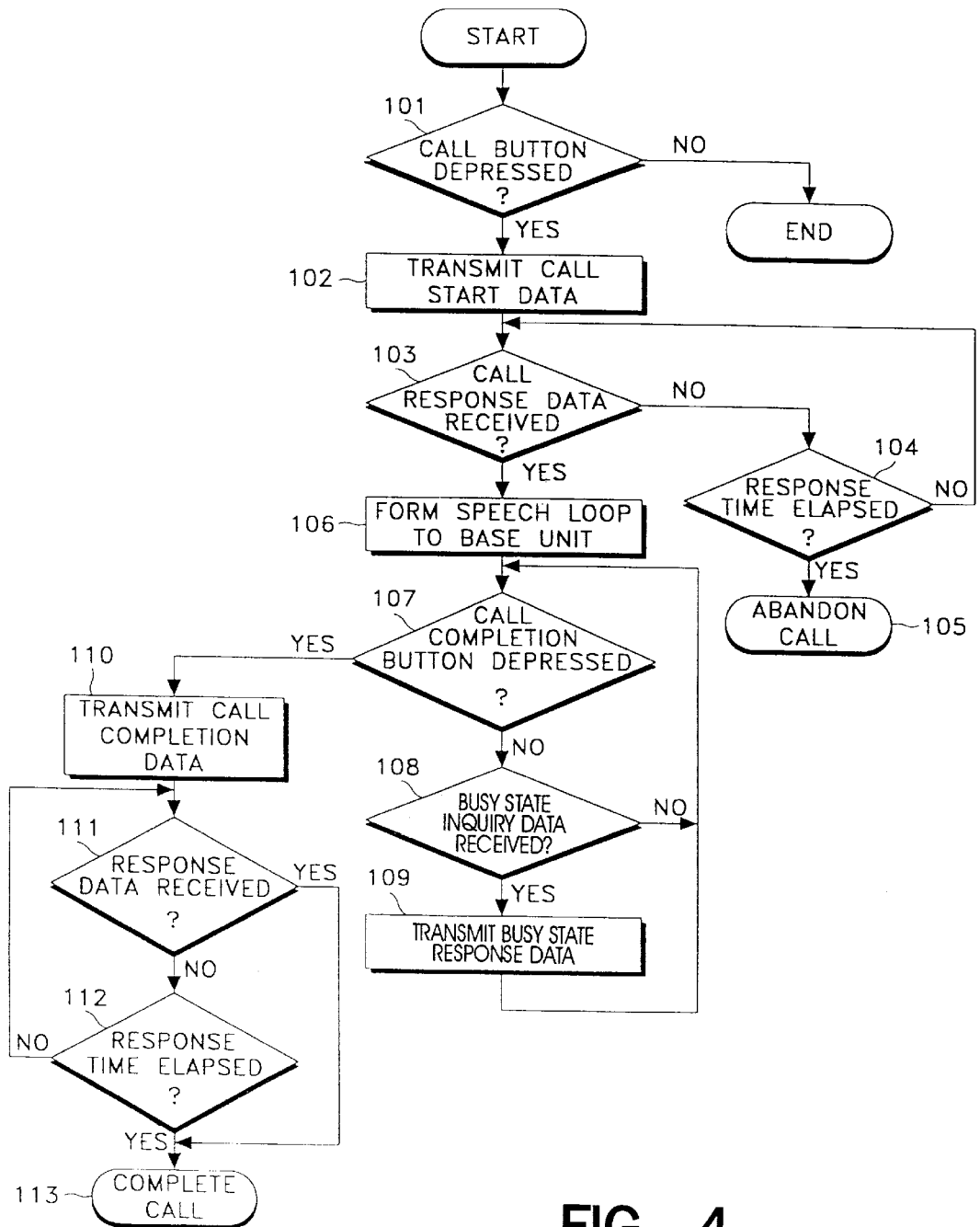
FIG. 4 is a flow chart for controlling the handset unit of FIG. 2 according to an embodiment of the present invention.

Referring to FIG. 2, there is shown a block diagram of the handset unit, in which a controller 12 controls an overall operation of the handset unit. A memory 14 stores a password for the handset unit, and temporarily stores data generated during executing a program. A key input section 10 is composed of a plurality of function keys for setting various functions and modes, and a plurality of numeric keys for dialing telephone numbers, to generate key data to the controller 12 according to key inputs by the user. A transmitter 20 transmits a transmittal voice signal generated from a microphone 18 through an antenna 22, under the control of the controller 12. A receiver 24 demodulates the signal received through the antenna 22 to provide a speaker 26 with the demodulated signal, and provides the controller with various control data. A transmission/reception controller 28 controls the transmitter 20 and the receiver 24 using the transmitting/receiving frequency based on the channel data generated from the controller 12. A display 30 displays the key input status and an operational status of the handset unit.

Now, referring to FIGS. 1 through 4, operation of the preferred embodiment of the present invention will be described in detail hereinbelow. First, if a user depresses a call button of the handset unit to make a telephone call, the controller 12 of the handset unit checks, at a step 101, whether or not the call button is depressed. If the call button is depressed, the transmitter 20 transmits call start data to the base unit, at a step 102. At this moment, the controller 32 of the base unit checks, at a step 201, whether or not the receiver 38 has received the call start data through the antenna 58. If the call start data is received, the transmitter 36 transmits call response data responsive to the call start data to the handset unit, at a step 202. Then, at a step 103, the controller 12 of the handset unit checks whether or not the receiver 24 has received the call response data from the base unit. If the call response data is not received, the controller 12 checks, at a step 104, whether or not a response time has elapsed. If the response time has not elapsed, the process returns to the step 103 to wait for the call response data. In a little while, if the response time has elapsed, the controller 12 abandons the call at a step 105. However, if the call response data is received at the step 103, the controller 12 forms a speech loop to the base unit at a step 106. Meanwhile, after transmission of the call response data at the step 202, the controller 32 of the base unit forms the speech loop to the handset unit and the telephone line, at a step 203, so as to start the telephone call. Thereafter, the controller 32 of the base unit initializes a call time counter to recount the call time, at a step 204. The controller 32 of the base unit checks, at a step 205, whether or not the call time has exceeded a predetermined time. If the call time has not exceeded the predetermined time, the controller 32 checks whether call completion data is received or not, at a step 210. If the call completion data is not received, the process returns to the step 205. However, if the call completion data is received, the controller 32 transmits call completion response data to the handset unit at a step 211, and completes the call at a step 212.

Meanwhile, upon completion of the telephone conversation, the user depresses a call completion button prepared in the key input section 10 of the handset unit. Then, the controller 12 of the handset unit checks, at a step 107, whether or not the call completion button prepared in the key input section 10 is depressed. If the call completion button is depressed, the controller 12 transmits the call completion data to the base unit at a step 110. Thereafter, the controller 12 checks, at a step 111, whether or not the call completion response data is received from the handset unit. If the call completion response data is received, the call is completed at a step 113. However, if the call completion response data is not received, the controller 12 checks, at a step 112, whether or not a call completion response time has elapsed. If the call completion response time has not elapsed, the process returns to the step 111.

Further, if the call completion data is not received over a predetermined time after starting the call at the step 205, the controller 32 of the base unit transmits the busy state inquiry data at a step 206. The busy state inquiry data is for checking whether the handset unit engages the call. Then, the controller 12 of the handset unit checks, at a step 108, whether the busy state inquiry data is received. If the busy state inquiry data is received, the controller 12 transmits busy state response data to the base unit at a step 109 and then, returns to the step 107. The busy state response data is for notifying that the handset unit is currently engaged in the call. Meanwhile, after transmission of the busy state inquiry data at the step 206, the controller 32 of the base unit checks, at a step 207, whether or not the busy state response data is received. If the busy state response data is received, the process returns to the step 204 and initializes the call time counter to recount the call time. However, if the busy state response data is not received, the controller 32 checks, at a step 208, whether or not a busy state response time has elapsed. If the busy state response time has not elapsed, the process returns to the step 207. However, if the busy state response time has elapsed, the call is completed at a step 209.

In other words, if the base unit does not receive the call completion data from the handset unit within a predetermined time, for example, 60 minutes, then the base unit transmits the busy state inquiry data to the handset unit. Then, in response to the busy state inquiry data, the handset unit transmits the busy state response data within the busy state response time, for example, 10 seconds. However, if the busy state response data is not received over the busy state response time, i.e., 10 seconds, it is judged that the handset unit is out of order or runs out of the battery. Then, at the step 209, the controller 32 of the base unit cuts off the speech loop to complete the call.

As described in the foregoing, during the telephone conversation, the base unit periodically transmits the busy state inquiry data to the handset unit, and checks whether the response data thereto is received or not within the predetermined time. If the response data is not received within the predetermined time, the speech loop is automatically cut off. Therefore, in case that the handset unit misoperates due to the damage or the discharge of the battery, the base unit forcefully releases the call so that the user may make a telephone call with the base unit or another handset unit.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention.

What is claimed is:

1. A method for releasing a call in a cordless telephone including a base unit and a handset unit, comprising the steps of:

checking whether said base unit has received call completion data from said handset unit;

transmitting busy state inquiry data to said handset unit to check whether said handset unit is engaged with a call, when said call completion data is not received within a first predetermined time; and cutting off a speech loop, when busy state response data, notifying that the handset unit is currently engaged in the call, and being responsive to said busy state inquiry data, is not received from said handset unit within a second predetermined time.

2. A method for releasing a call in a cordless telephone including a base unit and a handset unit, comprising the steps of:

transmitting call start data to the base unit upon depressing a call button prepared in the handset unit, so as to form a speech loop between the handset unit and a telephone line;

checking whether or not the base unit has received call completion data from the handset unit within a first predetermined time;

transmitting busy state inquiry data to said handset unit to check whether said handset unit is engaged with a call, when said call completion data is not received within said first predetermined time; and cutting off said speech loop between the base unit and the telephone line, when busy state response data, notify that said handset unit is currently engaged in the call and being responsive to said busy state inquiry data, is not received from said handset unit within a second predetermined time.

3. A method for releasing a call in a cordless telephone according to claim 2, further comprising the step of initializing a call time count to count a call time, when said response data is received from said handset unit within said second predetermined time.

4. A method for releasing a call in a cordless telephone including a base unit and a handset unit, comprising the steps of:

forming a speech loop between the handset unit and a telephone line, upon receiving call start data from the handset unit;

initializing a call time count value to count a call time;

checking whether or not the base unit has received call completion data from the handset unit;

transmitting busy state inquiry data to said handset unit to check whether said handset unit is engaged with a call, when said call completion data is not received from the handset unit within a predetermined time;

transmitting busy state response data to the base unit to notify that the handset unit is currently engaged in the call, when said handset unit has received busy state inquiry data from the base unit; and cutting off said speech loop between the base unit and the telephone line, when said response data that is responsive to said busy state inquiry data is not received from said handset unit.

5. An apparatus for releasing a call in a cordless telephone, comprising:

a base unit comprising a controller, a transmitter, a receiver, and a key input section;

a handset comprising a controller, a transmitter, a receiver, and a key input section containing a call completion button, wherein when said base unit is not in receipt of a call completion data signal transmitted from said key input section of said handset, said base unit, checking whether said handset unit is engaged with a call, transmits to said handset a busy state inquiry signal.

6. The apparatus of claim 5, wherein said base unit releases said call if said base unit is not in receipt of a busy state response in response to said busy state inquiry, said busy state response for notifying said handset is currently engaged in the call.

7. An apparatus for releasing a call in a cordless telephone, comprising:

a base unit comprising:
  a controller for sending and receiving information to and from a handset,
  a receiver receiving a call completion signal and a busy state response signal from said handset, notifying that said handset is currently engaged in said call, and
  a transmitter transmitting a busy state inquiry signal to said handset, checking whether said handset is engaged with said call;

said handset unit comprising:
  a controller sending and receiving information from said base unit,
  a key input section allowing a user to input a call completion signal,
  a receiver receiving a busy state inquiry signal from said base unit, and
  a transmitter transmitting both said call completion signal and a busy state response signal to said base unit, wherein said busy state response signal is in response to said busy state inquiry signal and said busy state inquiry signal is in response to failing to receive said call completion signal from said handset.

* * * * *